May 28, 1968 — L. A. AMTSBERG ETAL — 3,385,377
GOVERNOR CONTROLLED NUT-RUNNER

Filed July 7, 1966 — 3 Sheets-Sheet 1

INVENTORS
LESTER A. AMTSBERG
WILLIAM K. WALLACE
BY
Stephen J. Rudy
ATTORNEY

May 28, 1968

L. A. AMTSBERG ET AL 3,385,377

GOVERNOR CONTROLLED NUT-RUNNER

Filed July 7, 1966

INVENTORS
LESTER A. AMTSBERG
WILLIAM K. WALLACE
BY
Stephen J. Rudy
ATTORNEY

May 28, 1968 L. A. AMTSBERG ET AL 3,385,377
GOVERNOR CONTROLLED NUT-RUNNER
Filed July 7, 1966 3 Sheets-Sheet 3

INVENTORS
LESTER A. AMTSBERG
WILLIAM K. WALLACE
BY
Stephen J. Rudy
ATTORNEY

United States Patent Office 3,385,377
Patented May 28, 1968

3,385,377
GOVERNOR CONTROLLED NUT-RUNNER
Lester A. Amtsberg, Utica, and William K. Wallace, Barneveld, N.Y., assignors to Chicago Pneumatic Tool Company, New York, N.Y., a corporation of New Jersey
Filed July 7, 1966, Ser. No. 563,497
10 Claims. (Cl. 173—12)

The present invention is concerned with an improvement in a pneumatically powered nut-running tool of a type having a torque limiting cam clutch, the driving member of which is adapted to override and repeatedly disengage and re-engage a driven clutch member upon experiencing a predetermined overload. The improvement relates to a governor controlled valve which functions automatically in response to this overriding action of the clutch to moderate flow of operating air to the motor so as to reduce the speed of the motor and, as a consequence, reduce the frequency of the disengaging and re-engaging action of the clutch until operation of the tool is finally stopped.

As the driving clutch member overrides the driven clutch member after overload in tools of this type, it imparts a series of torque impulses to the driven member which tend to overtighten the work beyond the set torque. By reducing the speed of the motor and, as a consequence, the frequency of the disengaging and re-engaging action of the clutch members, this tendency to overtighten the fastener after an initial predetermined torque has been delivered, will be decreased. Further, the life of the tool will be increased by limiting the number of excursions the driving clutch member makes beyond the maximum torque delivery points of the driven clutch member after the work, which may be a nut or other threaded fastener, has been driven to a predetermined degree of tightness.

In the accompanying drawings:

FIG. 1 representing the upper half of the tool, and FIG. 1A, the lower half;

Figure 8:
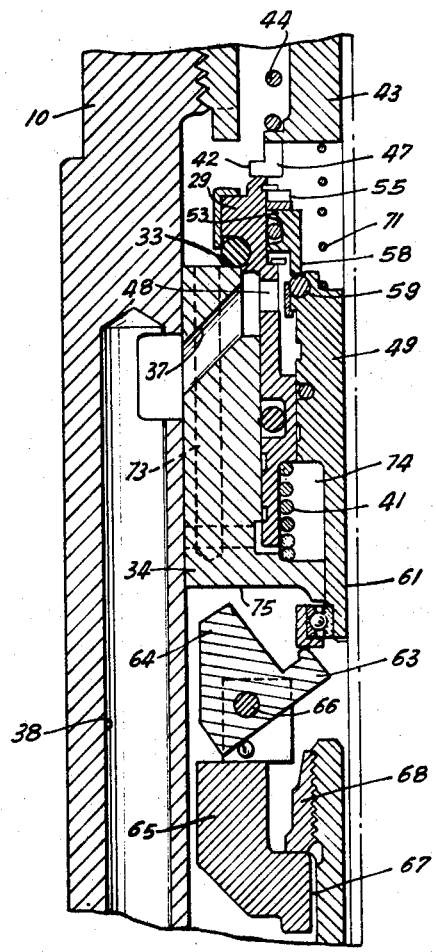
Figure 7:
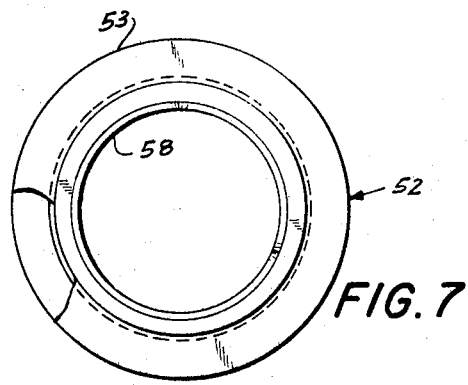
FIG. 7 is a detail in bottom plan of the governor valve seat.
Figure 9:
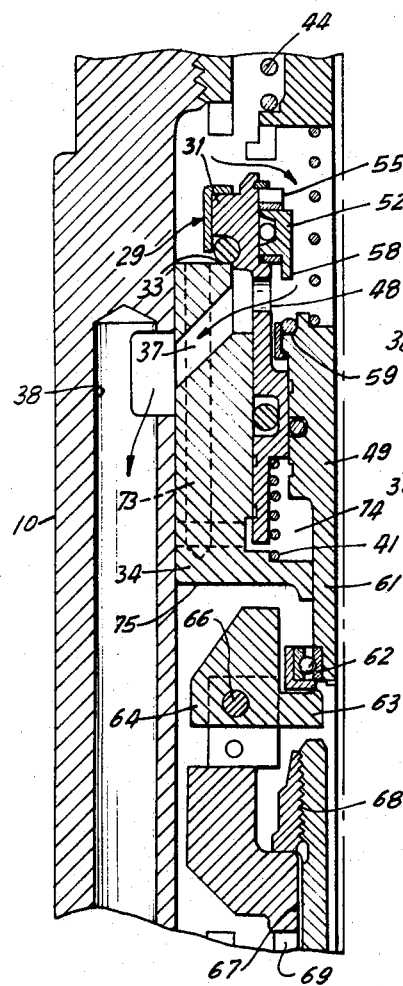
Figure 6:
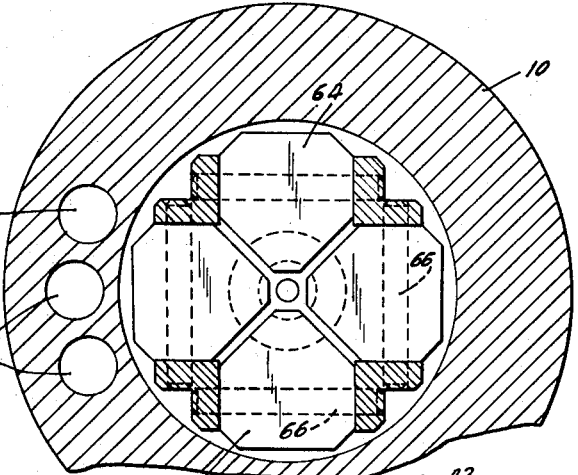
FIG. 6 is a section taken on line 6—6 of FIG. 1.

FIG. 8 is a fragmentary sectional view showing the closed condition of both the governor and main valves following the initial delivery of maximum torque; and FIG. 9 shows the condition of the governor and main valves following the initial closing of both the governor and main valves and until power is finally shut off, the governor valve varying in its position relative to the governor valve seat according to the speed of the motor.

Figure 3:
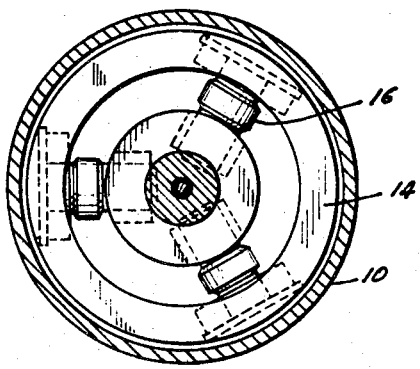
FIG. 3 is a section on line 3—3 of FIG. 1A of the bottom or driving face of the driving clutch member.
Figure 4:
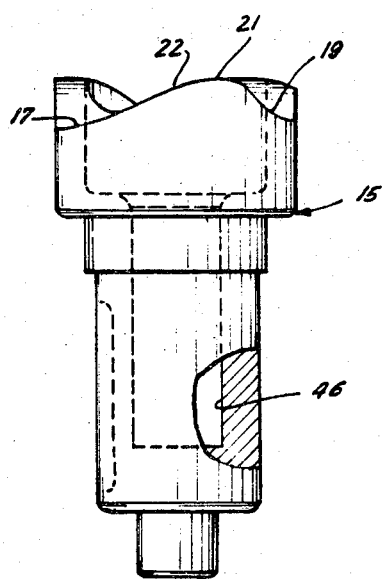
FIG. 4 is a detail in elevation of the driven clutch member.
Figure 1A:
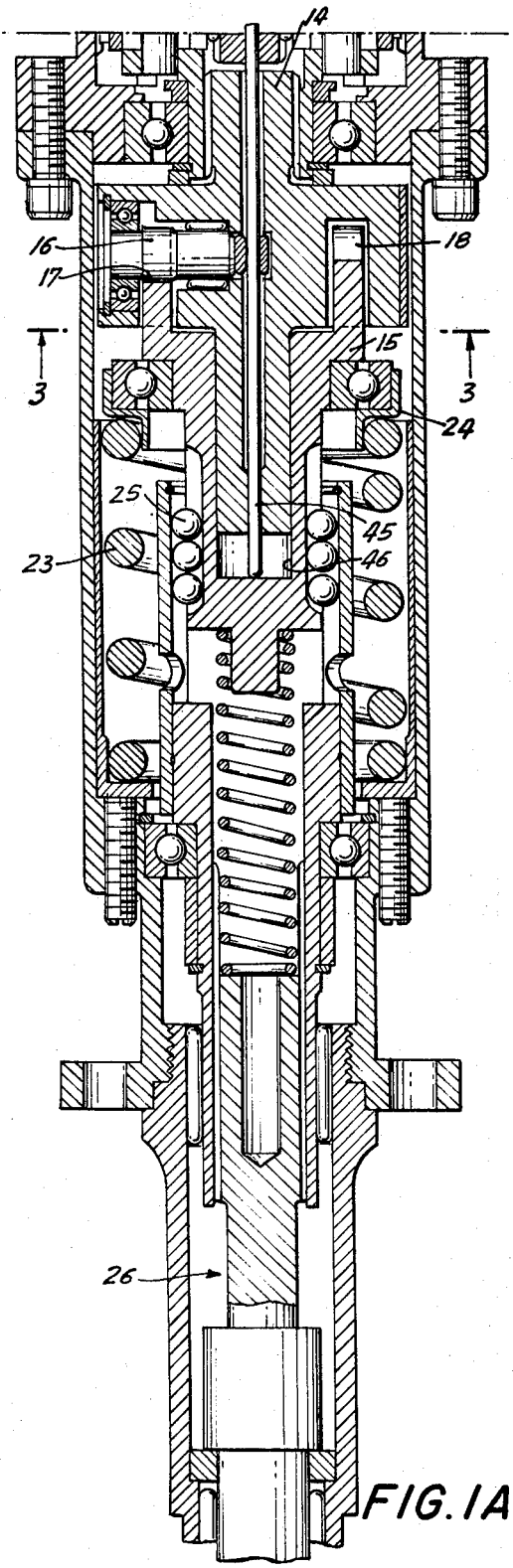
Figure 5:
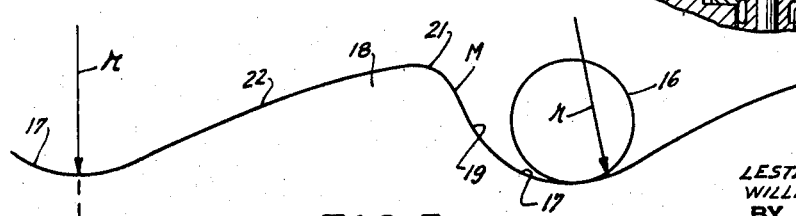
FIG. 5 is a development view of a cam lobe of the driven clutch member, together with a roller of the driving clutch member engaged in one of the pockets of the driven member.

In the drawings is disclosed a nut-runner having a housing 10 in which is supported a conventional pneumatically powered rotary motor 11 of the radially slidable vane type. Drivably coupled by means of reduction gearing 12 to an output shaft end 13 of the motor is a driving clutch member 14 of a rotary cam clutch. The driving member has a torque releasable driving engagement with a driven cam clutch member 15. This driving engagement is defined here by means of a plurality of circumferentially equally spaced rollers 16, three in number (FIG. 3), carried by the driving member, each having clutched engagement with a separate pocket 17 of the driven member. Each pocket, as best illustrated in FIGS. 4 and 5, has an inside radius $r$ relatively greater than the radius of the roller 16 engaged therein; and each pocket is circumferentially separated from the other by means of a cam lobe 18. Each lobe has a short forward slope 19 tangent at its low end to one end of a pocket and merging at its other end in a rounded cam crest 21; and each lobe has a long back slope 22 declining from a point of tangency with the cam crest to a point of tangency with an end of the next adjacent pocket.

The driven clutch member 15 is movable axially against the resistance of a heavy clutch spring 23 relative to the driving member 14. This spring constantly biases the driven member axially into clutched engagement with the driving member. The force of the spring is transmitted through a bearing cup 24 to the driven member 15. The driven member has a slidable splined driving connection 25 with output spindle means 26. The latter is connected at its terminal end with a work engaging member (not shown), such as a wrench socket. As overload is experienced by the driven member 15, the driving clutch member is adapted to cam the driven member axially against the opposing force of the clutch spring, and, following maximum torque delivery, to continuously override the cam lobes 18 from pocket to pocket until the operating air supply to the tool is finally shut off. With each excursion of the driving member over the cam lobes further torque impulses are delivered to the work. Because of a tendency of these impulses to overtighten the work, means is provided, as will be hereinafter described, to reduce this tendency.

An inlet port 27 to the housing is connectable to a source, not shown, of pressurized pneumatic fluid. The inlet port leads into an inlet chamber 28 located above a main control sleeve valve 29 controlling flow of operating air from the chamber to the motor. The valve (FIGS. 1, 2, 8, 9) has an annular head 31 carrying an O-ring 32 about its underside which is movable with the valve relative to a main valve seat 33. The latter is formed about the upper end of a stationary bushing 34. The main valve has a reduced piston portion 35 extending into the bushing. The bushing has a counterbore 36 defining an annular space about the upper end of the piston portion 35. This space connects by means of side ports 37 in the bushing with passages 38 in the housing 10 leading to the motor chamber 39.

The main valve is open at its ends. A valve opening spring 41 positioned between an internal shoulder of the valve and a bottom flange of bushing 34, normally biases the valve to an elevated open condition as in FIGS. 1 and 2, wherein the head 31 of the valve abuts legs 42 of a spring cup 43. The cup is held seated under the load of a main valve closing spring 44 atop a control slide rod 45. This rod depends axially and slidably through the motor and the driving clutch member into a recess 46 of the driven clutch member 15 where it seats upon the bottom of the recess. The closing spring 44 exerts a force upon cup 43 relatively greater than the opposing force exerted by the valve opening spring 41 upon the valve. But, the closing spring is normally disabled from forcing the spring cup and the rod downward to close the valve, because of the greater opposing force of the clutch spring 23 which normally holds the driven clutch member engaged and rod 45 elevated.

The legs 42 of the spring cup are separated by spaces 47 which allow flow of operating air at all times to the upper interior end of valve 29. Radial ports 48 in the piston portion of the valve serve to communicate the upper interior of the valve with the outer surrounding space 36 leading to the motor chamber. A governor regulated valve 49 slidable axially in a reduced interior area 51 of the main valve 29 is cooperable with a governor valve seat 52 carried by the main valve to regulate flow of operating air from the interior of the main valve to the radial ports 48.

The governor valve seat 52 is open at its ends (FIGS. 1, 7–9). It includes an annular flanged head 53 having slidable movement at the upper end of the interior of the main valve. An overhead spring washer 55, positioned between the top of the governor valve seat and an overhead retainer ring, biases the governor valve seat downwardly upon a shoulder 57. A short skirt 58 depends from the head of the governor valve seat to a point substantially level with the upper end of the radial ports 48. The governor valve 49 has an O-ring 59 about its top which is cooperable with the bottom of the governor valve seat 52 to regulate flow of air from the interior of the main valve through ports 48 to the annular space 36 leading to the motor chamber. A stem 61 depends from the governor valve with a slide fit through an opening in the bottom flange 75 of bushing 34. The end of the stem is journalled externally of the bushing in a bearing 62. The bearing overhangs a radial finger 63 of each of four centrifugal flyweights 64 of a governor 65. The flyweights are pivotally supported upon cross pins 66 in slots of the governor. The governor has an axial splined connection 67 with an upper shaft end of the motor, and is restrained against relative axial movement by means of a nut 68 and a bearing 69. The governor valve 49 is biased downwardly relative to the flyweight fingers by means of an overhead spring 71. An internal shoulder 72 of the valve 29 serves to curb the extent of this downward movement to a normal position, as in FIGS. 1 and 2.

Figure 1:
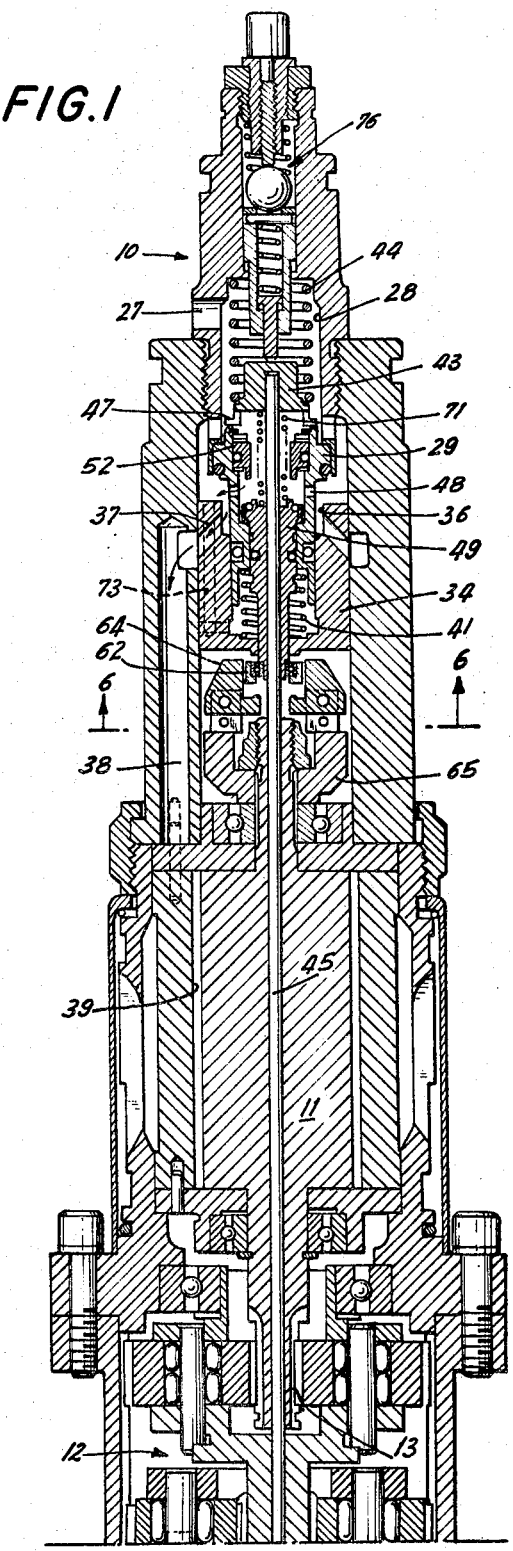
FIGS. 1 and 1A illustrate in longitudinal section a pneumatically powered nut-running tool embodying the invention.
Figure 2:
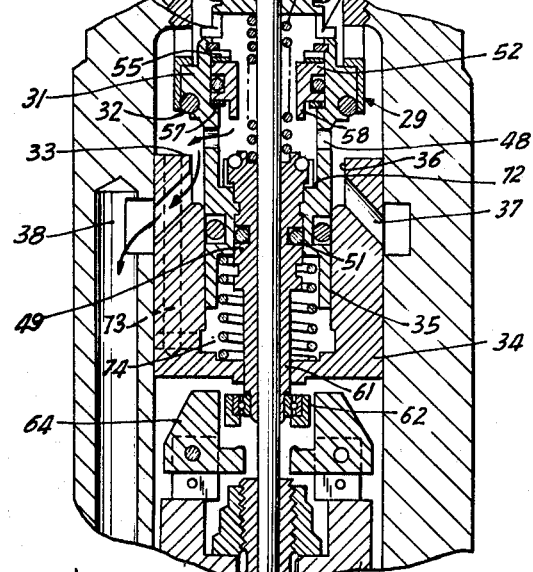
FIG. 2 is an enlargement of the governor and main valve portions of FIG. 1.

The nut-runner is shown in FIGS. 1 and 2 prior to being put in operation. When live air is admitted to the inlet chamber 28, it flows over two paths to the common annular space 36 leading to the motor. One of these paths is through the spaces 47 of spring cup 43 to the interior of the main valve 29, from where it passes through the governor valve seat 52 and the radial ports 48 to the annular space 36 of bushing 34; the other path is from the inlet chamber 28 around the head of the main valve to the annular space 36. Air flowing to the common space 36 passes through the side ports 37 and connecting passages 38 to operate the motor. Live air further flows from the inlet chamber 28 to a passage 73 (shown in broken line) in the bushing wall communicating with a chamber 74 at the underside of the main valve. The air in the latter chamber provides, together with the valve opening spring 41 a counterbalancing force on the main valve while the latter is in open condition.

Operation of the motor acts through the output spindle means 26 to run the work down to a set torque, or predetermined degree of tightness. During this free running action, the high speed of the motor swings the governor flyweights 64 centrifugally whereby the fingers 64 thereof cooperate with the bearing 62 to elevate the governor valve 49 relative to the main control valve 29. The governor valve is limited in this movement by the flange 75 at the bottom of the bushing and allows at this time, because of the elevated condition of the main valve and the associated governor valve seat 52, flow of air through radial ports 48. As the torque resistance of the work increases, the clutch rollers 16 are carried by the driving member 15 over the inside radii r of the pockets 17 and up the short slopes 19 of the cam lobes 18. Maximum torque delivery is transmitted through the clutch to the output spindle at about the time the rollers ride over the points M of the short slopes. As the rollers ride over the inside radii, the driven clutch member 15 is cammed axially downward by the driving clutch member, causing the slide rod 45 and the main control valve 29 as a unit to follow this movement under the load of the valve closing spring 44. As the rollers ride over the points M, the governor valve seat 52 moves down with the main valve sufficiently to engage the O-ring 59 of the governor valve to block flow of air through the radii ports 48 to the motor; and at about the time the rollers approach the cam crests 21, the main valve will engage its seat 33 to block flow of air around its head to the motor passages 38. As the main valve engages its seat, the governor valve seat 52 is pressed upon the O-ring 59 of the governor valve. This forces the valve seat 52 to slide upwardly a little against the resistance of the overhead spring washer 55, as appears in FIG. 8. Stoppage of air flow to the motor upon seating of both the main valve and governor valve slows the motor. The residual energy of the motor is, however, sufficient to carry the rollers from the short slopes 19 over the crests 21 onto the back slopes 22 of the cam lobes. The clutch spring then re-expands in response to the latter action. As it re-expands, it simultaneously re-engages the driven clutch member with the driving clutch member and re-elevates the slide rod 45 and spring cup 43 to remove the force of the closing spring 44 from the head of the main valve 29. The main valve, however, does not at this time restore to open condition, but remains closed upon its seat as in FIG. 9, since it is pneumatically unbalanced due to its differential area and the pressure of air acting over its head is relatively greater than the combined opposing force of the opening spring 41 and the pressure of air in chamber 74.

At about the time that the rollers enter into engagement with the next adjacent pockets 17 following movement of the rollers down the back cam slopes 22, the speed of the motor will have slowed sufficiently to cause the governor flyweights 64 to progressively retract inwardly. This action causes the governor valve to progressively move downwardly under the load of the return spring 71 away from the governor valve seat 52, permitting live air from the interior of the main valve to again flow through the radial ports 48 to operate the motor, as appears in FIG. 9. The motor continues operating, but its speed is controlled from then on by the varying movement of the governor controlled valve 49 relative to the governor valve seat 52. The governor so controls the valve 49 as to allow a moderate air flow to the motor through ports 48. The operation of the motor under this condition causes the rollers to override the driven clutch member at a reduced speed and to be carried at such reduced speed from pocket to pocket. This slow rate of operation will continue until the supply of operating air to the inlet chamber 28 is finally shut off either by the operator, or automatically by means of a monitoring circuit associated with switch control mechanism generally indicated at 76 (FIG. 1) at the top end of the tool; the mechanism 76 is disclosed in greater detail in our co-pending patent application Ser. No. 446,315, filed Apr. 7, 1965, now Patent No. 3,322,205. When the operating air supply to the tool is finally shut off, the governor control valve 49 opens fully under the load of its return spring 71 as the flyweights 64 are retracted. Pressure air trapped in the inlet chamber 28 over the main valve vents at this time through the open governor valve to the motor, whereupon the valve opening spring 41 acts to re-elevate the main valve 29 and governor valve seat 52 to normal open condition preparatory to a new cycle of operation.

What is claimed is:

1. In a nut running tool including a pneumatic motor; output spindle means; a torque limiting cam clutch transmitting the torque of the motor to the spindle means, the cam clutch including a driving member connected to the motor and a driven member connected with the spindle means, the driving member being adapted, following transmission of an initial torque to the driven member, to override and deliver a series of torque impulses to the latter; the improvement comprising means operable automatically in response to the overriding action of the driving member to limit the rotational speed of the motor and as a consequence reduce the frequency of subsequent delivery of impulses to the driven member.

2. In a nut running tool according to claim 1 wherein the last mentioned means includes an operating air supply chamber; a first passage; a main valve communicating the supply chamber through the first passage with the motor; a second passage; a governor valve communicating the supply chamber through the second passage with the motor; a governor valve seat carried by the main valve; and a centrifugal governor means operatively connected with the motor having cooperation with the governor valve to move it to open and closed condition relative to the valve seat; the main valve having a normal open position wherein the valve seat is disabled from being engaged by the governor valve, and having a closed position wherein the governor valve is engageable with the valve seat.

3. In a nut running tool including a pneumatic motor; a main valve controlling flow of operating air to the motor; a torque disengageable cam clutch transmitting rotation of the motor to output means, the clutch comprising a driving part connected to the motor and an axially movable driven part spring loaded into clutched engagement with the driving part, the driving part adapted under overload to cam the driven part axially from clutched engagement against the resistance of the spring load and to override the driven part, the spring load being responsive upon such overriding action to return the driven part to clutched engagement; and control means responsive to the disengaging action of the driven part to cause closing of the main valve; the improvement comprising secondary valve means responsive to the closing action of the main valve to moderate flow of operating air to the motor while the main valve is closed.

4. In a nut running tool according to claim 3, wherein the secondary valve means includes a seat member carried by the main valve, and a governor controlled valve operatively connected to the motor having cooperation with the seat member to moderate flow of operating air to the motor when the main valve is closed.

5. In a nut running tool according to claim 4, wherein the main valve has a normal open position in which the seat member is disabled from having cooperation with the governor controlled valve.

6. In a nut running tool including pneumatic motor, an operating air supply chamber, a common passage for conducting operating air to the motor, a first and a second passage connecting the supply chamber with the common passage, a main valve normally allowing flow of operating air from the chamber through the first passage to the common passage, torque output means, a torque limiting cam clutch transmitting rotation of the motor to the output means, the clutch having a driving part connected to the motor and a driven part connected to the output means, a clutch return spring biasing the driving and driven parts into clutched engagement, the driving part adapted while the motor is running to repeatedly override the driven part following overload, and control means responsive to this overriding action to close the main valve; a governor controlled valve means operatively connected to the motor having a normal condition allowing flow of operating air from the supply chamber through the second passage and being responsive to closing of the main valve to provide a governed moderate flow of operating air from the second passage to the common passage during the period that the main valve is closed.

7. In a nut running tool according to claim 6, wherein the governor controlled valve means includes a governor slide valve, and the main valve carries a governor valve seat normally retained by the main valve clear of the governor slide valve.

8. In a nut running tool according to claim 7, wherein the governor controlled valve means includes a centrifugal governor connected to the motor having centrifugally operable flyweights cooperable with the governor slide valve to move the later relative to the governor valve seat.

9. In a nut running tool according to claim 8, wherein a return spring exerts a biasing force upon the governor slide valve away from the governor valve seat toward the governor flyweights.

10. In a nut running tool according to claim 7, wherein the governor valve seat abuts upon a shoulder of the main valve under the bias of a spring.

References Cited
UNITED STATES PATENTS

| | | | |
|---|---|---|---|
| 3,187,860 | 6/1965 | Simmons | 192—150 X |
| 3,257,913 | 6/1966 | Broom et al. | 173—12 X |
| 3,263,785 | 8/1966 | Krouse et al. | 192—150 |
| 3,298,481 | 1/1967 | Schaedler et al. | 173—12 X |

ERNEST R. PURSER, *Primary Examiner.*